Dec. 23, 1952   R. E. CLARK ET AL   2,622,769
DEVICE FOR DISCHARGING NONFLOWING MATERIALS
Filed Aug. 31, 1949
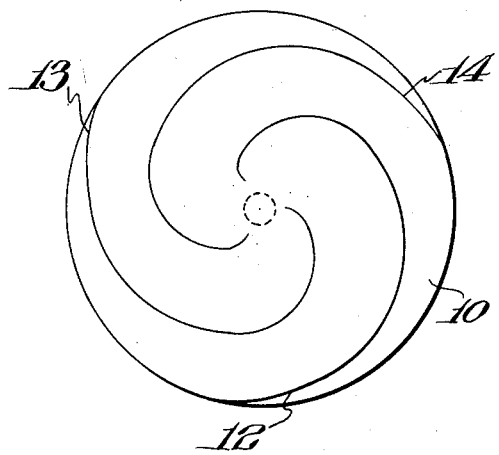
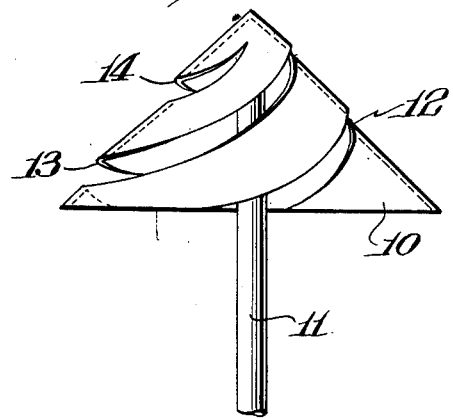
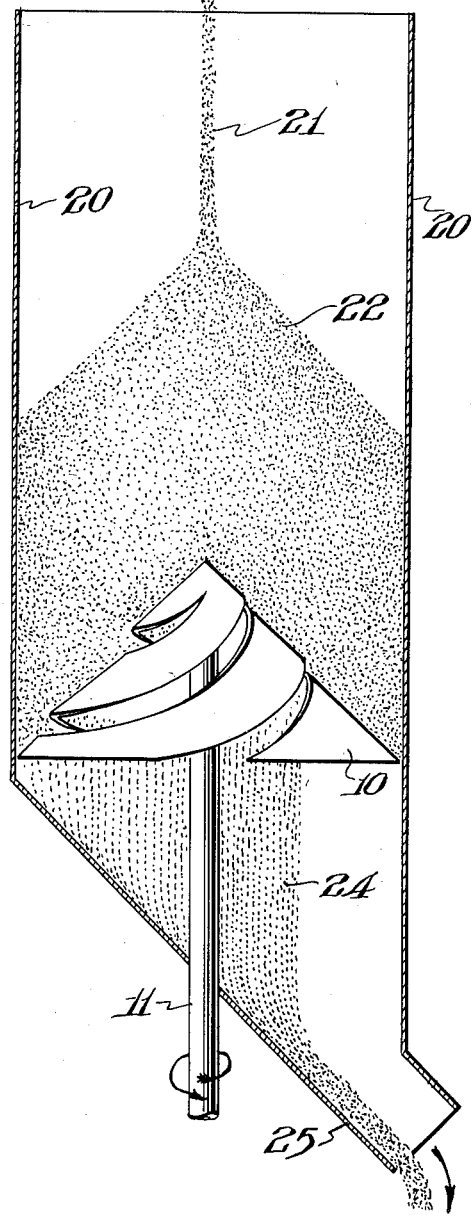
INVENTORS:
William Verne Turner &
Robert Ellis Clark
BY
Norris E. Ruckman
ATTORNEY

UNITED STATES PATENT OFFICE 2,622,769

DEVICE FOR DISCHARGING NONFLOWING MATERIALS

Robert Ellis Clark, Midlothian, and William Verne Turner, Richmond, Va., assignors to E. I. du Pont de Nemours & Company, Wilmington, Del., a corporation of Delaware Application August 31, 1949, Serial No. 113,329

1 Claim. (Cl. 222—413)

This invention relates to a device for removing non-flowing materials from the bottom of a storage tower, and is particularly concerned with a device with which alkali cellulose may be continuously and uniformly discharged from an aging tower in the manufacture of viscose.

In the manufacture of rayon and cellophane by the viscose process, cellulose pulp is converted first to alkali cellulose and then to cellulose xanthate. Cellulose pulp is steeped in caustic solution, excess solution is pressed out, and the alkali impregnated pulp is shredded into crumbs which seem almost dry to the touch. The alkali reacts with the cellulose very slowly and it is necessary to age the alkali cellulose crumbs for many hours at regulated temperature. On the other hand, it is important to stop the aging and proceed with preparation of the xanthate derivative before the alkali reaction has gone too far, as otherwise the cellulose molecules are degraded and weak rayon or cellophane products result.

The critical control of aging time necessary presents special problems when aging is to be conducted in a continuous or semi-continuous aging tower. In this type of aging the alkali cellulose crumbs are fed into the top of a storage tower and aged crumbs are removed from the bottom of the tower after the proper time interval. Crumbs are added for aging at a rate approximating that at which the aged crumbs are removed to maintain a supply of aged crumbs. Therefore the tower is full of crumbs of different degrees of aging. It is necessary for the crumbs to progress uniformly down the tower as the aging proceeds so that there is no appreciable mixing of crumbs having different aging times. Various devices were tried which would remove the crumbs from the tower, but these caused mixing of the crumbs. Thus a device which removed crumbs only from the central portion of the tower caused the crumbs to descend through the tower more rapidly at the center than at the outside. Another device, somewhat resembling a rotating meat slicer, having a radial cutter which removed crumbs from all parts of the bottom of the tower, turned the mass around with the cutter. The resulting mixing action was only partially corrected by the use of baffles.

Accordingly it is an object of the present invention to provide a device which will remove non-flowing materials uniformly from all parts of the bottom of a storage tower without appreciable mixing of different layers of material. A further object is to provide a device with which materials can be removed from the bottom of a storage tower at a rate approximating that at which materials are added to the top of the tower, and in a uniform manner without mixing materials which have been in the tower for different periods of time, so that materials can be aged in the tower for definite times. A still further object is to provide a continuous aging tower for alkali cellulose crumbs to which crumbs can be continuously added, aged for a definite period of time and then uniformly removed without mixing with crumbs which have aged for different periods of time. Other objects of the invention will become apparent from the following disclosure and the appended claim.

In accordance with the present invention it has been found that the above objects are accomplished with a generally cylindrical storage tower for non-flowing material, the tower having a rotatable discharge device of conical shape which forms the bottom of the tower, the cone being provided with at least one helical slot spiralling outwardly from near the apex of the cone to the outside of the cone, one edge of the slot being raised relative to the other edge, the raised edge acting to cut off a layer from material in the tower and guide this layer through the slot when the cone is rotated in the proper direction to press the raised edge through the material. Preferably the raised edge is on the uppermost side of the slot so that when the cone is rotated it screws its way through the material. It is also preferable that the material added to the tower be added at the axis of the tower and that the shape of the cone approximate the angle of repose of material at the top of the tower when added in this manner.

In the drawing, which illustrates a preferred embodiment of the invention,

Fig. 1 is a plan view of a conical discharge device,

Fig. 2 is a side elevation of the conical discharge device, and

Fig. 3 is a side elevation, partly in section, of a storage tower, showing the conical discharge device in position at the bottom of the tower.

Referring to Figs. 1 and 2, it will be seen that the discharge device shown somewhat resembles an umbrella, with a conical member 10 supported on the upper end of a drive shaft 11. The shaft could, of course, continue above the cone 10 if it were desired to support or drive the cone from above. Three equally spaced helical slots 12, 13, and 14 have been cut into the cone. The slots spiral outwardly from near the apex of cone in a clockwise direction. The innermost edges (sides nearest the apex of the cone) of these slots have been bent upward to act as knives which will slice off a layer from material resting on the cone when the cone is rotated in a counter-clockwise direction. Since the slots spiral outward from the center gradually, the edges will slice smoothly through subdivided material and neither push the material around with the cone nor exert a mixing action to any appreciable extent. The openings of the slots should be large enough to accommodate the material sliced off. The cone should be made of sufficiently heavy metal to withstand the weight of material resting on it without distortion.

Referring to Fig. 3, the discharge device is shown in position in a storage or aging tower having cylindrical sides 20. The cone 10 is in the same position of rotation as shown in Fig. 2. Non-flowing material, such as alkali cellulose crumbs, is being added in a stream 21 at the axial center of the tower. The material forms a sloping pile 22 which rests on the cone 10. It will be seen that the angle of the cone has been selected so as to approximate the slope or angle of repose of the pile 22. In the case of alkali-cellulose crumbs this angle of repose is about 45 degrees.

The cone 10 extends to within a negligible distance of the sides of the tower so that material can only leave the tower through the slots of the cone. Since the material is non-flowing it will pass through the slots to an appreciable extent only as the cone is rotated, and the rapidity of removal from the tower can be controlled by the speed of rotation of the cone. The cone is shown in the process of being rotated and the material is falling from the cone in a stream 24. The material then slides down a chute 25 to the next operation.

In a typical small scale operation a tower was kept filled to a depth of two feet with alkali cellulose crumbs and the conical discharge device was rotated at 0.4 revolution per minute to discharge 5.2 pounds of material per minute. The extent of mixing was determined by providing layers of material of different colors in the tower. If the performance had been ideal mixed layers would have been observed emerging from the chute during only a few seconds, i. e., an almost perfect separation of layers would have been achieved by switching the emerging material from one receptacle to another at the proper instant. In actual operation under the above conditions, some mixing of layers was observed over a period of 3 to 4 minutes. This time is short when compared with results achieved with other types of discharge devices, and the time should be less with a higher level of material in the tower because there would then be more resistance to twisting of the mass with the cone.

By the above invention a device is provided which makes possible the uniform removal of non-flowing material from all parts of a storage tower at a controlled rate. The rate can be varied as desired to conform to the rate at which materials are added to the tower or at which materials are needed for further operations. When used for discharging materials from an aging tower, the device makes possible control of the aging time to within a variation of only 3 to 4 minutes. The discharge device will function equally well when operated continuously or intermittently.

As many apparently widely different embodiments of this invention may be made without departing from the spirit and scope thereof, it is to be understood that we do not limit ourselves to the specific embodiment thereof except as defined in the appended claim.

What is claimed is:

Apparatus for continuously aging non-flowing materials which comprises in combination a cylindrical storage tower of suitable size to provide storage for material added continuously at the top and discharged from the bottom after a required aging time, said tower having vertical sides so that successive layers of subdivided material will descend through the tower without mixing, and a rotatable conical discharge member forming the bottom of the tower for removing material uniformly at a controlled rate to provide a definite aging time, the axis of rotation of said conical member coinciding with the axis of the cone and the axis of the tower, the sides of said conical member sloping downward from said axis at an angle of about 45° and said conical sides being provided with a cutting edge formed by a helical slot spiralling gradually outward from near said axis to the side of the tower, the upper edge of said slot being raised relative to the other edge of the slot.

ROBERT ELLIS CLARK.
WILLIAM VERNE TURNER.

REFERENCES CITED

The following references are of record in the file of this patent:

UNITED STATES PATENTS

| Number | Name | Date |
|---|---|---|
| 1,173,451 | Matthews | Feb. 29, 1916 |
| 1,606,100 | Ruetz | Nov. 9, 1926 |

FOREIGN PATENTS

| Number | Country | Date |
|---|---|---|
| 47,874 | Denmark | Oct. 3, 1933 |